United States Patent [19]

Ticknor

[11] 3,861,673
[45] Jan. 21, 1975

[54] BI-DIRECTIONAL SHEET TRANSPORT

[75] Inventor: Raymond G. Ticknor, Fairport, N.Y.

[73] Assignee: Xerox Corporation, Stamford, Conn.

[22] Filed: Oct. 29, 1973

[21] Appl. No.: 410,646

[52] U.S. Cl. ............ 271/225, 198/127 R, 271/272
[51] Int. Cl. ............................................ B65h 5/06
[58] Field of Search ......... 271/225, 272, 51, 52, 53, 271/184, 273, 274; 198/127 R, 127 E, 167

[56] References Cited
UNITED STATES PATENTS

| | | | |
|---|---|---|---|
| 2,181,241 | 11/1939 | Klemm | 271/225 X |
| 3,447,665 | 6/1969 | Egeland et al. | 198/127 |
| 3,630,518 | 12/1971 | Street | 271/272 X |
| 3,663,013 | 5/1972 | Wickers | 271/272 X |
| 3,710,917 | 1/1973 | Black et al. | 198/127 |

*Primary Examiner*—Evon C. Blunk
*Assistant Examiner*—Bruce H. Stoner, Jr.

[57] ABSTRACT

Apparatus for transporting sheets in a first direction and then selectively driving the sheets in a different direction, all within a space not substantially larger than the sheet. The sheet is transported by a plurality of rotating balls mounted in a ball carriage. The balls are in two interspersed sets, and drive discs are mounted to selectively engage one set of balls for rotation in one sheet driving direction or the other set of balls for rotation in the other sheet driving direction. The selection of the sheet driving direction may be accomplished by a slight shifting of the ball carriage. Mating overlying balls can be provided for engaging the opposite surface of the sheet. This apparatus is also disclosed as part of a book cover insertion system.

10 Claims, 9 Drawing Figures

BI-DIRECTIONAL SHEET TRANSPORT

The present invention relates to sheet transport apparatus, and in particular to compact apparatus for transporting sheets with a plurality of rotating balls including simple means to change the direction of movement of the sheet.

Exemplary prior sheet transport mechanisms for moving a sheet in a first direction and then moving it in a second direction without rotation of the sheet conventionally utilize two separate transport mechanisms at right angles to one another, such as two separate sets of feed belts or frictionally driven multiple rotating balls. The sheet is moved by the first set of belts or balls onto the second set. However, this requires two separate sheet handling areas, and drive mechanisms and shifting of the sheet by some means from the one transport mechanism to the other. Examples of previously known bi-directional sheet transports, or driven ball sheet transports, are disclosed in the following issued U.S. Pat. Nos. which are hereby incorporated by reference in this specification: 1,745,311, issued Jan. 28, 1930, to A. Olson, et al; 1,889,513, issued Nov. 29, 1932, to A. Broadmeyer; 2,249,186, issued July 15, 1941, to G. Spiess; and 3,630,518, issued Dec. 28, 1971, to L. J. Street.

The present invention accomplishes positive driving of the sheet in at least two different pre-selected directions, even at right angles, in a single compact structure which need not occupy any greater transverse area than the sheet being transported and yet can provide a positive drive of the sheet at all times, i.e., the sheet is not moved between two different transport mechanisms. Thus, the present apparatus is particularly suited for operations in which the position of the sheet must be accurately controlled both in position and time, such as for book binding systems, for registration of a sheet with a xerographic image to be transferred in electrostatographic systems, etc.

It will be appreciated that the term "sheet" as used herein is intended to be read broadly to cover any type of generally planar member being transported, such as paper sheet, a plate, cardboard, book covers, a stack of paper, transparencies, or the like, either individually or in overlying stacks. The number, spacing and surface texture of the balls may, of course, be changed to accommodate materials of different stiffness and texture.

Further objects, features and advantages of the invention pertain to the particular arrangement and structure whereby the above-mentioned aspects of the invention are obtained. The invention will be better understood by reference to the following description and to the drawings forming a part thereof, which are substantially to scale, wherein.

Figure 7:
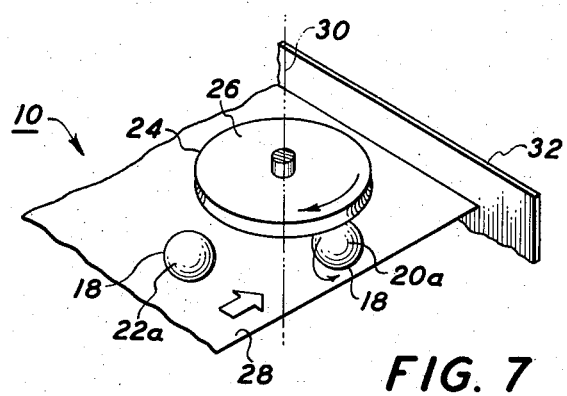
Figure 3:
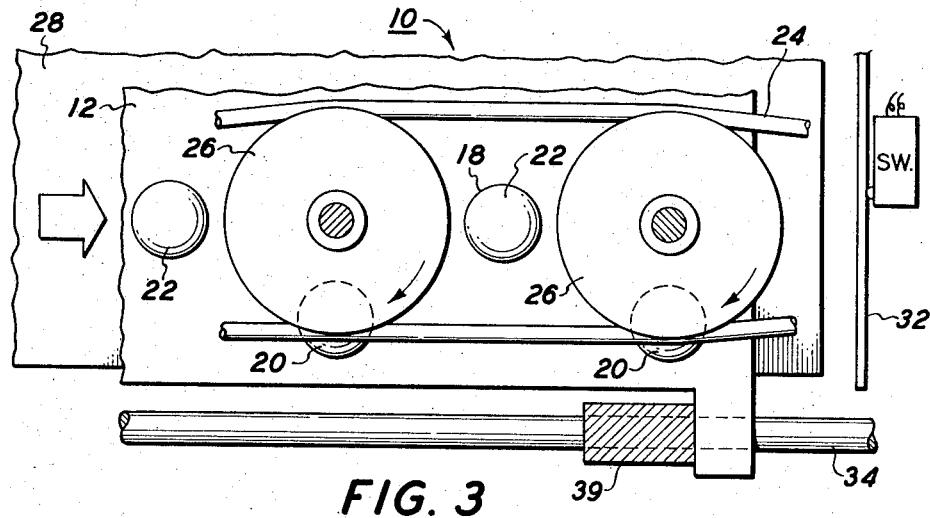
FIG. 3 is an enlarged portion of FIG. 1, also showing a sheet of paper being transported therein in a first direction of movement.
Figure 4:
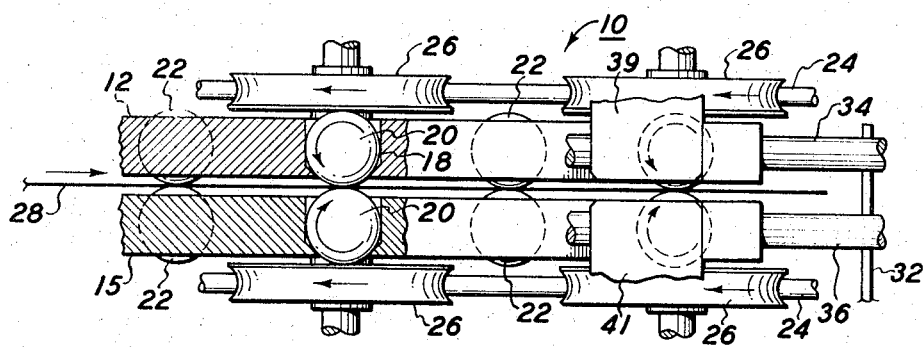
FIG. 4 is a side view of FIG. 3, i.e., an enlarged portion of FIG. 2.
Figure 8:
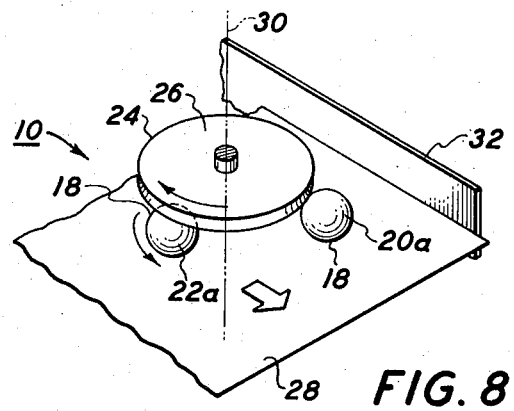
Figure 5:
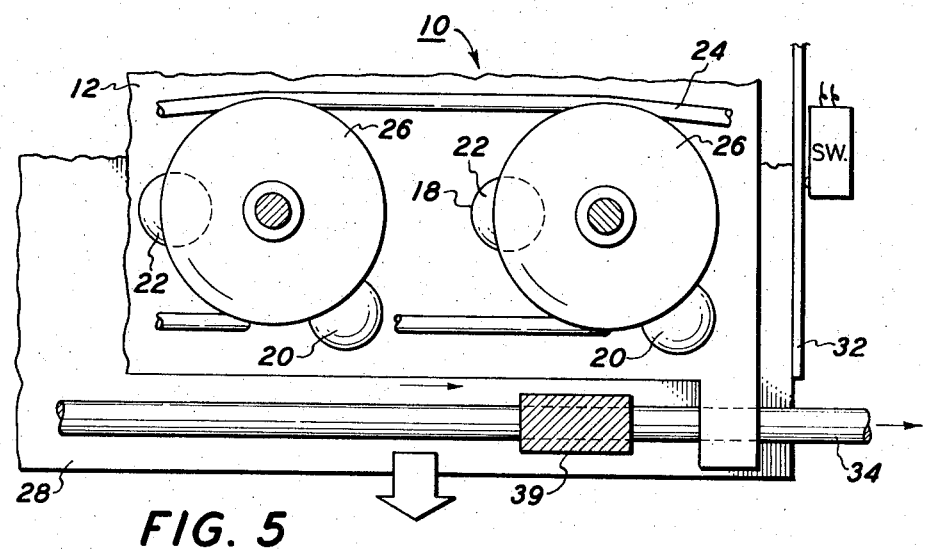
Figure 6:
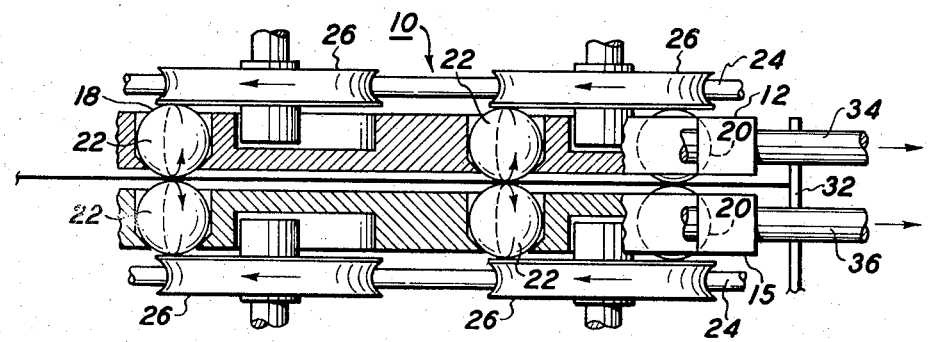
Figure 9:
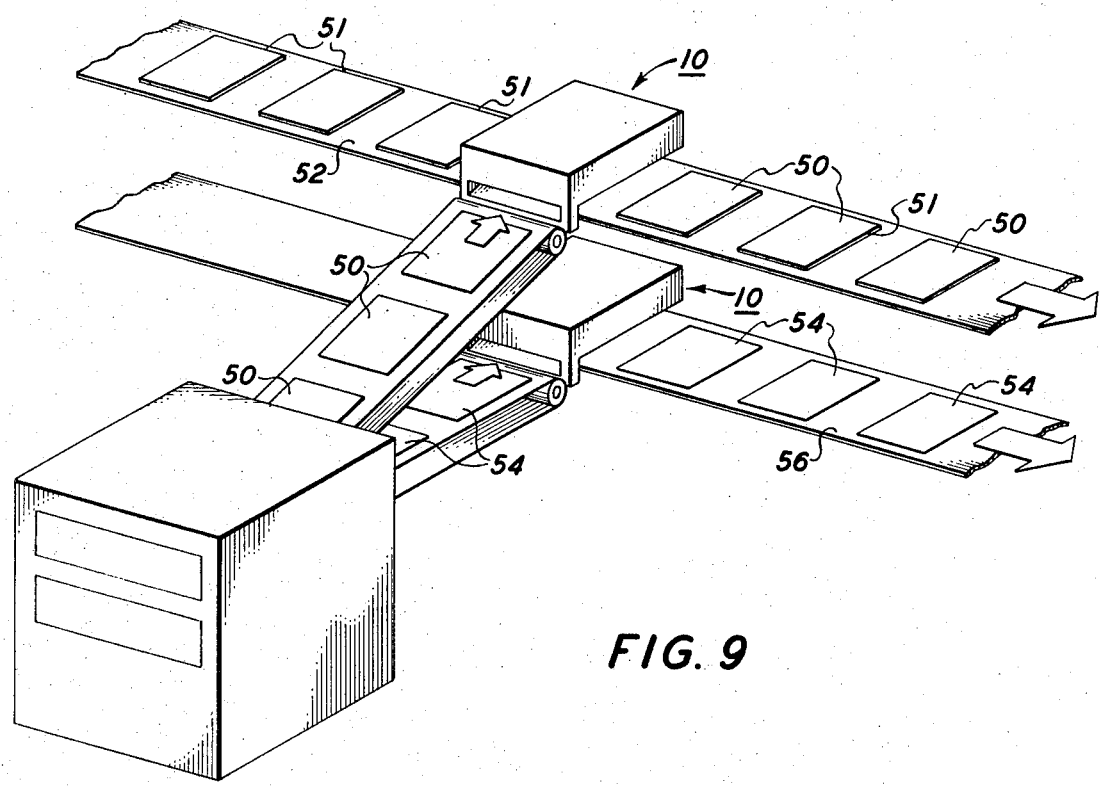

FIG. 5 corresponds to FIG. 3, except only that the apparatus is shown in its second mode of operation, shifted to drive the sheet of paper in a second direction of motion;

FIG. 6 is a side view of FIG. 5, corresponding to FIG. 4, except for the direction of drive of the sheet;

FIG. 7 is a simplified perspective view of a portion of the same apparatus illustrating schematically the sheet driving operation in the first direction as in FIGS. 3 and 4;

FIG. 8 is the same as FIG. 7, except that it shows schematically the sheet being driven in the second direction as in FIGS. 5 and 6; and FIG. 9 illustrates two of the sheet transport apparatus of FIGS. 1-8 utilized in a book cover insertion system for book binding.

Referring now to the FIGS. 1-9, there is shown therein an exemplary embodiment of the present invention, which in a single apparatus 10 transports sheets first in one direction to an aligned stop position, and then upon demand moves the sheets in a second direction at right angles to the first direction. The disclosed apparatus 10 occupies a space approximately the same size as the sheet being transported. The sheet is shown transported between opposing mating sets of rotating balls, which are identically supported and driven. Thus, in the following description it will be appreciated that the description of the operation and structure at one portion of the apparatus is applicable to its corresponding opposing half portion. This has the advantage of positively driving both sides of the sheet at the same (opposing) points for more positive sheet transport. However, it will be appreciated that this may not be required in all cases.

Figure 1:
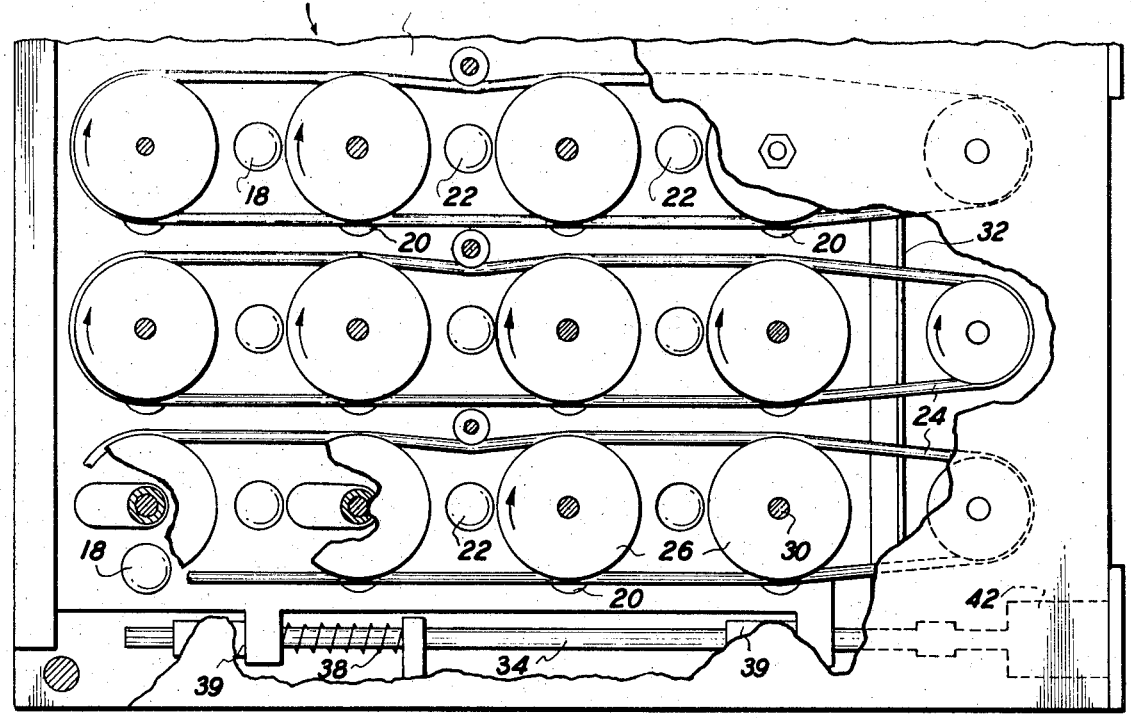
FIG. 1 is a plan view of an exemplary sheet transport apparatus in accordance with the present invention, with the upper cover partly broken away for clarity.
Figure 2:
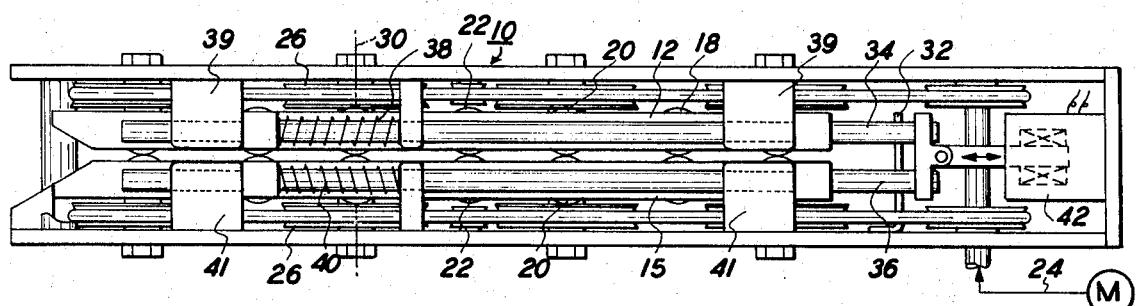
FIG. 2 is a side view of the sheet transport apparatus of FIG. 1.

Referring first to the overall plan and side views of the apparatus 10 in FIGS. 1 and 2, it may be seen that there are two planar plates providing two opposing ball carriages, an upper ball carriage 12 and a lower ball carriage 15. Both ball carriages 12 and 15 are evenly multiply apertured by cylindrical apertures extending therethrough to rotatably retain a plurality of balls in a spaced apart relationship in the carriage plate. A multiplicity of spherical balls 18 are freely rotatably mounted in these apertures to extend slightly above and below each ball carriage plate. The carriage plates and their balls 18 may be of any suitable material, such as plastic or light weight metal. The carriages 12 and 15 preferably have smooth planar surfaces so as not to provide any sheet obstructions. The balls 18, may have, if desired, a higher friction surface for engagement with the sheet to be transported.

All of the balls 18 in each ball carriage are divided in a first ball set 20 and a second ball set 22. These ball sets comprise balls 18 which differ only in their position on the ball carriage 15 relative to the drive discs 26 of the ball drive system 24 to be described hereinbelow. The first and second ball sets 20 and 22 are interspersed and spaced from one another on the ball carriage 15. The ball drive system 24 is in driving engagement with only one of these two balls sets at any one time, i.e., when one ball set is being driven the other is freely idling.

The ball drive system 24 comprises a plurality of rotatably driven and spaced apart frictional drive discs 26 each having its planar driving surface engaging a ball 18 on the side of the ball carriage opposite from the sheet transporting side. All of the discs 26 engage only the balls of one ball set at a time.

The sheet driving operation and the method of changing the direction of sheet drive may be readily understood from the simplified views of FIGS. 7 and 8, which show a single drive disc 26 acting alternately upon one of two balls 18, which in turn are shown driving a sheet of paper 28. It will be appreciated that the balls 18 in FIGS. 7 and 8 would be retained in position by their apertures in the upper ball carriage 12. However, for clarity, the upper ball carriage 12 is not shown here. In the first transporting position of FIG. 7, corresponding to FIGS. 3 and 4, the ball carriage 12 has positioned the individual ball 20a of the ball set 20 in driving contact under the disc 26 as shown, i.e., between the disc driving surface and the sheet 28. The ball 20a is near the outer edge of the cylindrical disc 26 and, therefore, it is driven in rotation at a rotational speed corresponding to the radius of disc 26 and to its rotational speed about its axis of rotation 30. Note that in this position that the other (next) adjacent ball, 22a of the other ball set 22, is spaced just out of reach of the disc 26, i.e., the radius of the disc 26 about the axis 30 is insufficient to reach the ball 22a in this position of the balls 20a and 22a relative to the disc 26. This also may be seen in FIGS. 3 and 4. Thus, the ball 22a is not driven at all in this position and has no affect on the sheet 20a other than to rotatably support it at an additional point as an idler.

It may be seen that with the first components position illustrated in FIG. 7 (and also in FIGS. 3 and 4, and 1 and 2) that the sheet 28 is driven only in a first linear direction of motion. This drive may be continuous, or it may be a drive motion which is stopped as shown here by an aligning edge stop 32 against which the leading edge of the sheet 28 is driven. The edge stop 32 thus provides a registration and aligning member. If desired, a switch or other sensing means such as illustrated in FIG. 3 may be provided associated with the edge stop 32 to sense the engagement of the sheet 28 with the edge stop 32. The ball drive system 24 may be stopped at this point. However, this is not required, and the drive system 24 may be operated continuously without interruption, allowing slippage to occur between the driving balls and the sheet.

Rapid and simple shifting of the direction of motion of the sheet 28 may be accomplished by a simple slight shifting of the ball carriages. The ball carriages may be shifted into the position illustrated in FIG. 8 and FIGS. 5–6 from the initial corresponding FIG. 7 and FIGS. 3–4.

Referring first to FIG. 8, it may be seen the slight shifting of the balls 20 and 22a relative to the disc 26 by their ball carriage causes the disc 26 to move out of engagement with the ball 20a and engages the ball 22a. Thus, the ball 20a is now driven by the disc 26. However, it may be seen that the ball 20a is spaced at a 90° angle from the ball 22a relative to the disc axis 30. Therefore, the driven direction of rotation of the ball 22a is now at right angles to the previous direction of rotation of the ball 20a. The ball 20a now is an idler, being rotated by the movement of the sheet 28 in the same direction of rotation as the ball 22a. This occurs for each disc 26 and for each of the individual balls of the first ball set 20 and second ball set 22 in the entire apparatus 10. Thus, the sheet 28 is now driven by all of the balls in the second ball set 22 in the second direction of motion at right angles to the original direction of motion of the sheet.

The shifting of the positions of the first ball set 20 and the second ball set 22 relative to the axis 30 of the discs 26 is accomplished by simply a short linear movement of the ball carriages 12 and 15. There is no change in the ball drive system 24. This distance may be very short and substantially less than the dimensions of the sheet being transported. Thus, it may be seen from the positional difference between FIG. 3 and FIG. 5, for example, that since there is essentially point contact between the discs 26 and the balls, that the balls 18 of one ball set may be positioned only slightly outside the radius of the discs when the discs are engaging the balls of the other ball set. Thus, only a slight linear disc axis movement relative to the balls shifts the drive from one ball set to the other. Further, this shifting movement of the ball carriages is in the same direction as the movement of the sheet itself and, therefore, does not distrub the abutment or alignment of the sheet 28 against the edge stop 32.

Considering now the means by which the ball carriages 12 and 15 are slightly shifted to effect the shifting engagement of the ball drive system 24 from the first set of balls 20 to the second set of balls 22, it may be seen especially from FIGS. 1 and 2, as well as from the difference between FIGS. 3 and 5, that the two ball carriages 12 and 15 are respectively slideably mounted by upper slide rods 34 and slide rods 36 extending along and secured to each side of the ball carriages in the first direction of movement of the sheet 28. The ball carriages are normally retained in the position for driving the first ball set 20, i.e., the position of FIGS. 1 – 4, by coil return springs 38 and 40. The slide rods 34 and 36 are slideably mounted through fixed rod guide pairs 39 and 41, which restrict the movement of the slide rods and their connecting ball carriages to a linear axial movement. The slide rods 34 and 36 may be commonly driven by a solenoid 42 (FIG. 2) or other suitable drive means. Upon actuation of the solenoid 42, it pulls the two slide rods 34 and 36, which in turn pulls the two ball carriages 12 and 15 from their initial or normal position of FIGS. 1–4 and 7 into the position for right angle sheet feeding of FIGS. 5, 6 and 8. As soon as the sheet 28 is fed out of the apparatus 10 the solenoid 42 may be released to allow the springs 38 and 40 to return the ball carriages to the initial sheet feeding position. The actuation of the solenoid 42 may be in response to a sheet sensing switch such as that shown in FIG. 3 associated with the edge stop 32.

Considering now the exemplary ball drive system 24 in further detail, it will be appreciated that the system described herein is merely exemplary and that numerous other means may be provided. In the apparatus 10 all the balls 18 in each of the two ball carriages are coplanar each other and the sheet 28. Thus, all of the discs 26 may be simply independently rotatably mounted in the same general plane to contact the balls at the outside of the ball carriages, with the disc axes 30 perpendicular the sheet 28. The periphery of each disc 26 is here grooved to receive a drive belt, as shown in FIGS. 4 and 6. As particularly shown in FIGS. 1 and 2, the discs 26 are located in parallel rows and each row is driven by a single drive belt from a common drive pulley located at one end of the row. The drive pulleys may in turn be commonly driven by a conventional motor to provide the desired sheet feeding speed. As previously noted, this operation may be continuous and no shifting of the motor speed or direction is required since the sheet feed feeding direction is shifted by movement of the ball carriages and not by any change in the ball drive system 24. This described arrangement is preferred since only a simple movement of the ball carriages is required. However, it will be appreciated that the shifting movement required is relative and that the frame mounting the belt drive system 24 could be moved relative to the ball carriages instead, if desired.

In the apparatus described herein it may be seen, especially in FIGS. 4 and 6, that the sheet is transported between mating pairs of balls on the upper and lower ball carriages, both of which are positively driven. This provides very positive sheet movement. However, it will be appreciated that in other situations, such as with heavy sheets, or with stacks of sheets of varying heights, that it may be desired to utilize only a lower ball carriage and not utilize any upper ball carriage or any upper balls. Alternatively, it may be desired to provide an upper ball carriage, but have only idler balls therein which mate with the lower balls for applying only a sheet retaining force.

It will also be appreciated that while the apparatus 10 is particularly suited for driving sheets in two directions at right angles to one another, that the angle does not have to be 90°. Simply by changing the location of the first and second ball sets with respect to one another so that they are at a different angle with respect to the axis 30 of the drive discs 26, any desired feeding angle may be provided.

Referring now to FIG. 9, two of the above-described apparatus 10 are shown incorporated as a part of a book binding operation to apply book covers. Front covers 50 are fed into the upper apparatus 10 at right angles to an upper transport 52 carrying the stacks or packages 51 of the book pages. At the proper time and position sequence as each page stack 51 pass under the upper apparatus 10, this apparatus 10 operates to shift its driving direction and feed out a front cover 50 in the same direction of movement as the transport 52, i.e., at right angles to its original direction of movement. The same thing is accomplished with the rear covers 54 being fed onto a second underlying transport 56. The initiation of the solenoid 42 for initiation of the final feeding of the cover sheets 50 and 54 in registration with the book page stacks 51 may be in direct controlled response to the sensing of the position of each book page stack.

In conclusion, it may be seen that there has been described herein a simple compact yet effective sheet transport apparatus for accurately changing the direction of movement of sheets. The apparatus described herein is presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. Apparatus for sheet transport where the sheet may be driven in a first direction of motion and then in a second and different direction of motion by the same apparatus comprising;
   a ball carriage for rotatably retaining a plurality of balls in a spaced apart relationship;
   first and second sets of individual balls rotatably mounted to said ball carriage positioned to engage a sheet,
   individual balls of said first and second sets of balls being interspersed, and spaced from one another on said ball carriage,
   drive means engaging only one of said first and second sets of balls at a time,
   said drive means, when engaging said first set of balls, rotatably driving said first set of balls in said first direction of motion,
   said drive means, when engaging said second set of balls, driving said second set of balls in said second direction of motion, and
   means for shifting said engagement of said drive means from said first set of balls to said second set of balls;
   wherein said drive means comprises a plurality of rotatably driven and spaced apart frictional drive surface means.

2. The apparatus of claim 1 wherein one of said first set of balls is angularly spaced from one of said second set of balls relative to each of said frictional drive surface means.

3. The apparatus of claim 2 wherein said means for shifting the engagement of said drive means comprises means for slightly shifting said ball carriage relative to said drive means.

4. The apparatus of claim 2 wherein said balls and said frictional drive surface means are co-planar, and wherein each said frictional drive surface means is rotatably driven about an axis of rotation extending between said balls perpendicular said plane, and wherein each said frictional drive surface means extends laterally in said plane by a distance sufficient to engage only one of said first or second sets of balls.

5. Apparatus for sheet transport where the sheet may be driven in a first direction of motion and then in a second and different direction of motion by the same apparatus comprising;
   a ball carriage for rotatably retaining a plurality of balls in a spaced apart relationship;
   first and second sets of individual balls rotatably mounted to said ball carriage positioned to engage a sheet,
   individual balls of said first and second sets of balls being interspersed, and spaced from another on said ball carriage,
   drive means engaging only one of said first and second sets of balls at a time,
   said drive means, when engaging said first set of balls, rotatably driving said first set of balls in said first direction of motion,
   said drive means, when engaging said second set of balls, driving said second set of balls in said second direction of motion, and
   means for shifting said engagement of said drive means from said first set of balls to said second set of balls;
   wherein said means for shifting the engagement of said drive means comprises means for slightly shifting said ball carriage and said balls retained therein relative to said drive means.

6. The apparatus of claim 5 wherein said ball carriage is shifted linearly in the same direction of motion as the sheet is being driven and shifted by only a small proportion of its dimensions, to effect said shifting of the engagement of said drive means from said first set of balls to said second set of balls.

7. The apparatus of claim 5 further including an aligning edge stop which said sheet can be driven into engagement against in said first direction of motion by said first set of balls.

8. The apparatus of claim 7 wherein said means for shifting the engagement of said drive means comprises means for slightly shifting said ball carriage relative to said drive means actuated automatically by engagement of a sheet against said edge stop.

9. The apparatus of claim 5 wherein said second direction of motion is at right angles to said first direction of motion.

10. The apparatus of claim 5 further including a second ball carriage overlying said first ball carriage and shifting therewith, and additional balls in said second ball carriage opposing and mating with said balls in said first carriage for engaging sheets therebetween.

* * * * *